United States Patent
Wang et al.

(10) Patent No.: US 11,829,132 B1
(45) Date of Patent: Nov. 28, 2023

(54) WATER SURFACE AND UNDERWATER DUAL-PURPOSE AUTOMATIC POSITIONING AND TRACKING SYSTEM AND METHOD

(71) Applicants: FIRST INSTITUTE OF OCEANOGRAPHY, MINISTRY OF NATURAL RESOURCES, Qingdao (CN); QINGDAO NATIONAL LABORATORY FOR MARINE SCIENCE AND TECHNOLOGY DEVELOPMENT CENTER, Qingdao (CN)

(72) Inventors: Guanlin Wang, Qingdao (CN); Yanfeng Wang, Qingdao (CN); Guanhui Liang, Qingdao (CN); Shujiang Li, Qingdao (CN)

(73) Assignees: FIRST INSTITUTE OF OCEANOGRAPHY, MINISTRY OF NATURAL RESOURCES, Qingdao (CN); QINGDAO NATIONAL LABORATORY FOR MARINE SCIENCE AND TECHNOLOGY DEVELOPMENT CENTER, Qingdao (CN)

( * ) Notice: Subject to any disclaimer, the term of this patent is extended or adjusted under 35 U.S.C. 154(b) by 0 days.

(21) Appl. No.: 18/178,992

(22) Filed: Mar. 6, 2023

(30) Foreign Application Priority Data

Jun. 10, 2022 (CN) .......................... 202210649497.4

(51) Int. Cl.
*G05D 1/00* (2006.01)
*G01S 1/74* (2006.01)
(Continued)

(52) U.S. Cl.
CPC ........... *G05D 1/0022* (2013.01); *B63B 21/16* (2013.01); *B63B 79/15* (2020.01); *B63B 79/40* (2020.01);
(Continued)

(58) Field of Classification Search
CPC .. G05D 1/0022; G05D 1/0016; G05D 1/0206; B63B 21/16; B63B 79/15;
(Continued)

(56) References Cited

U.S. PATENT DOCUMENTS 6,400,645 B1 * 6/2002 Travor ................. G10K 11/006
367/4
2020/0284903 A1 * 9/2020 Zach ......................... G01S 7/56

FOREIGN PATENT DOCUMENTS

CN 203190978 U 9/2013
CN 203832713 U 9/2014
(Continued)

OTHER PUBLICATIONS

Jul. 31, 2022 Office Action issued in Chinese Patent Application No. 202210649497.4.
(Continued)

*Primary Examiner* — Jess Whittington
*Assistant Examiner* — Brian E Yang
(74) *Attorney, Agent, or Firm* — Oliff PLC

(57) ABSTRACT

A water surface and underwater dual-purpose automatic positioning and tracking system and method, which belongs to the field of marine environment observation technologies. The positioning and tracking system includes: a rope winding and unwinding structure, arranged on a main hull structure; where the rope winding and unwinding structure includes a rope roller and a winding and unwinding rope wound around the rope roller; an auxiliary positioning remote control ship, located outside a main body of the main
(Continued)

hull structure, where the auxiliary positioning remote control ship is in transmission and fixed connection with the winding and unwinding rope away from the rope roller; communication control units, arranged on the main hull structure and the auxiliary positioning remote control ship; and an automatic positioning tracker unit, arranged on the hull structure, where the automatic positioning tracker unit is in remote communication connection with the communication control units.

8 Claims, 2 Drawing Sheets

(51) Int. Cl.
   B63B 21/16    (2006.01)
   B63B 79/40    (2020.01)
   G05D 1/02     (2020.01)
   B63B 79/15    (2020.01)
   B63G 8/00     (2006.01)
   B63B 21/56    (2006.01)

(52) U.S. Cl.
   CPC ............ *G01S 1/751* (2019.08); *G05D 1/0016* (2013.01); *G05D 1/0206* (2013.01); *B63B 2021/566* (2013.01); *B63G 2008/005* (2013.01)

(58) Field of Classification Search
   CPC ... B63B 79/40; B63B 2021/566; G01S 1/751; B63G 2008/005
   See application file for complete search history.

(56) References Cited

FOREIGN PATENT DOCUMENTS

| | | |
|---|---|---|
| CN | 106546954 A | 3/2017 |
| CN | 108341029 A | 7/2018 |
| CN | 109001739 A | 12/2018 |
| CN | 110254642 A | 9/2019 |
| CN | 110824551 B | 12/2020 |
| CN | 114044089 A | 2/2022 |
| CN | 114200401 A | 3/2022 |
| CN | 114426079 A | 4/2022 |
| CN | 112018665 B | 7/2022 |
| WO | 94/14081 A1 | 6/1994 |

OTHER PUBLICATIONS

Jul. 19, 2022 Office Action issued in Chinese Patent Application No. 202210649497.4.

* cited by examiner

WATER SURFACE AND UNDERWATER DUAL-PURPOSE AUTOMATIC POSITIONING AND TRACKING SYSTEM AND METHOD

TECHNICAL FIELD

The present invention relates to the field of marine environment observation technologies, and in particular, to a water surface and underwater dual-purpose automatic positioning and tracking system and method.

BACKGROUND

Currently, when a marine environment is observed, it is usually necessary to launch an underwater observation system (such as a submerged buoy and a seabed foundation) equipped with an acoustic releaser into water, and determine an accurate position to put the underwater observation system.

In the conventional technology, a common practice to determine a position of an underwater observation system is to control a hull to reach at least three different positions, then use a deck operation unit on board to measure a slant range between an above-water transducer and an underwater acoustic releaser, and manually perform a trigonometric function operation based on water depths and latitudes and longitudes of the three ranging positions, so as to obtain a more accurate underwater position of the acoustic releaser.

However, in practice, each time a slant range and a water depth are recorded, and an on-site operation is performed, on-site workload will be significantly increased. Especially when on-site sea conditions are poor, errors occur easily during calculation, so that an actual launching position of the underwater observation system cannot be accurately determined in a short time, which wastes manpower and material resources and ship time, resulting in some economic losses.

In addition, when the underwater observation system is recovered to the water surface, because the acoustic releaser used to determine a slant range floats on the water surface under an action of a floating ball, the system is very vulnerable to drift and turbulence due to influence of waves and wind on the water surface, so that it is difficult to measure stable slant range data quickly and timely. Meanwhile, as a moving target, it is difficult to calculate by using a three-point positioning method. Therefore, an accurate position of the target cannot be obtained.

SUMMARY

Therefore, the present invention provides a water surface and underwater dual-purpose automatic positioning and tracking system and method, to resolve the technical problems in the conventional technology that when an accurate position of an underwater observation system is obtained by using an acoustic releaser, on-site workload is heavy, and errors occur easily due to influence of sea conditions, and when the acoustic releaser floats on the water surface during recovery of the underwater system, it is difficult to quickly and timely measure a slant range because of fast drift and intense turbulence due to influence of waves and wind, so that an accurate position of a target cannot be obtained in time through calculation.

To achieve the foregoing objective, the present invention provides the following technical solutions:

A water surface and underwater dual-purpose automatic positioning and tracking system, arranged on a main hull structure, where the positioning and tracking system includes:

a rope winding and unwinding structure, arranged on the main hull structure, where the rope winding and unwinding structure includes a rope roller and a winding and unwinding rope wound around the rope roller;

an auxiliary positioning remote control ship, located outside a main body of the main hull structure, where the auxiliary positioning remote control ship is in transmission and fixed connection with one end that is of the winding and unwinding rope and that is away from the rope roller;

communication control units, arranged on the main hull structure and the auxiliary positioning remote control ship respectively; and an automatic positioning tracker unit, arranged outside the hull structure, where the automatic positioning tracker unit is in remote communication connection with the communication control units.

On the basis of the foregoing technical solutions, the following improvements may be made to the present invention:

In an improvement of the present invention, the auxiliary positioning remote control ship includes a first auxiliary positioning remote control ship and a second auxiliary positioning remote control ship that are respectively located on two outer sides of the main body of the main hull structure.

Four sets of rope rollers are provided, the rope rollers are fixed in pairs at two side ends of the main hull structure in a sailing direction, winding and unwinding ropes of the two sets of rope rollers at one side end are in transmission and fixed connection with the first auxiliary positioning remote control ship at one end away from the rope rollers; and winding and unwinding ropes of the two sets of rope rollers at the other side end are in transmission and fixed connection with the second auxiliary positioning remote control ship at one end away from the rope rollers.

In an improvement of the present invention, winding and unwinding speeds and lengths of the winding and unwinding ropes of the two sets of rope rollers at each side end are identical.

The first auxiliary positioning remote control ship and the second auxiliary positioning remote control ship are always located at midperpendicular positions of connecting lines between corresponding two sets of rope rollers.

In an improvement of the present invention, the positioning and tracking system further includes an electric control assembly.

The electric control assembly includes a power supply and a control module that are electrically connected, and the control module is connected to the communication control units by using a circuit.

In an improvement of the present invention, the electric control assembly includes a first electric control module, a second electric control module, and a third electric control module; and the communication control units include a first control unit, a second control unit, and a third control unit.

The first electric control module and the first control unit are connected by using a circuit and are arranged in the main hull structure, the second electric control module and the second control unit are connected by using a circuit and are arranged in the first auxiliary positioning remote control ship, and the third electric control module and the third control unit are connected by using a circuit and are arranged in the second auxiliary positioning remote control ship.

In an improvement of the present invention, the first control unit, the second control unit and the third control unit each include a control panel body, and an LCD touch screen, a GPS and external antenna terminal, a deck unit transducer, a switch and shortcut keys for path planning, and an input button for inputting a water depth that are respectively arranged on the control panel body.

Control modules in the first electric control module, the second electric control module, and the third electric control module are respectively in communication connection with the LCD touch screen, the GPS and external antenna terminal, and the deck unit transducer in a one to one correspondence by using a circuit; and the switch, the shortcut keys, and the input button are respectively connected to control input terminals of the control modules in the first electric control module, the second electric control module, and the third electric control module in a one to one correspondence by using a circuit.

A control output terminal of the control module in the first electric control module is connected to electric input terminals of the rope rollers located at two side ends of the main hull structure by using circuits.

In an improvement of the present invention, the automatic positioning tracker unit includes a circuit board, and a battery, an acoustic transducer, a radio antenna and a pressure switch that are respectively arranged on the circuit board; and the circuit board is further provided with a GPS and radio communication module.

The GPS and radio communication module is in communication connection with the GPS and external antenna terminal by using the radio antenna, and the automatic positioning tracker unit is in communication connection with deck unit transducers of the first control unit, the second control unit, and the third control unit respectively.

A method using the water surface and underwater dual-purpose automatic positioning and tracking system, where when obtaining a real-time accurate position of the automatic positioning tracker unit under water, the method includes the following steps:

S1: installing the automatic positioning tracker unit on an underwater observation system and launching the underwater observation system into water;

S2: when the underwater observation system equipped with the automatic positioning tracker unit is launched to a predetermined depth, automatically turning on the acoustic transducer inside the automatic positioning tracker unit under an action of a water pressure, and in this case, sending, by the first control unit arranged on the main hull structure and acting as an above-water unit, a ranging signal, receiving, by the acoustic transducer, the ranging signal, and giving, by the acoustic transducer, a real-time slant range between the acoustic transducer and the deck unit transducer inside the first control unit for the first time; and S3: after a first slant range measurement is completed, automatically giving, by the first control unit, another two positioning points to be measured and a sailing path planning for the main hull structure, where the main hull structure continues to go to the another two positioning points based on the path planning, repeating the foregoing steps to respectively carry out a second slant range measurement and a third slant range measurement, and after slant ranges at the three points are measured, inputting, by the first control unit, current water depth data by using the input button, and automatically calculating, by the first control unit, a trigonometric function based on a latitude and a longitude obtained by an internal GPS, so as to obtain a real-time accurate position of the automatic positioning tracker unit under water, and display the position on the LCD touch screen of the first control unit for launching recording and position reference before system recovery.

A method using the water surface and underwater dual-purpose automatic positioning and tracking system, where when obtaining a real-time accurate position of the automatic positioning tracker unit under water, the method includes the following steps:

S1: installing the automatic positioning tracker unit on an underwater observation system and launching the underwater observation system into water;

S2: remotely starting the first auxiliary positioning remote control ship and the second auxiliary positioning remote control ship, respectively, so that the first auxiliary positioning remote control ship and the second auxiliary positioning remote control ship can automatically sail by their own driving performance until the two sets of winding and unwinding ropes connected to the remote control ships are automatically released to a maximum value, and then the remote control ships stop sailing;

S3: when the automatic positioning tracker unit is launched to a predetermined depth, automatically turning on the acoustic transducer inside the automatic positioning tracker unit under an action of a water pressure, and in this case, synchronously sending, by the first control unit arranged on the main hull structure, the second control unit arranged on the first auxiliary positioning remote control ship and the third control unit arranged on the second auxiliary positioning remote control ship that act as above-water units, ranging signals, receiving, by the acoustic transducer, the ranging signals, and giving, by the acoustic transducer, real-time slant ranges between the acoustic transducer and the deck unit transducers inside the first control unit, the second control unit, and the third control unit;

S4: communicating, by the second control unit and the third control unit, measured slant ranges and obtained GPS position data to the first control unit by using an antenna, inputting, by the first control unit, current water depth data and a latitude and a longitude obtained by an internal GPS by using the input button, and automatically calculating a trigonometric function based on data returned by the second control unit and the third control unit, so as to obtain a real-time accurate position of the automatic positioning tracker unit under water, and display the position on the LCD touch screen of the first control unit for launching recording and position reference before system recovery; and S5: during recovery of the first auxiliary positioning remote control ship and the second auxiliary positioning remote control ship, correspondingly controlling and starting, by the control module in the first electric control module, electric rope rollers located at two side ends of a ship deck, so that the electric rope rollers at each side end synchronously start running and recover winding and unwinding ropes, until the first auxiliary positioning remote control ship and the second auxiliary positioning remote control ship return to initial positions after a set quantity of revolutions.

A method using the water surface and underwater dual-purpose automatic positioning and tracking system, where when a submerged buoy, a seabed foundation or another system equipped with the automatic positioning tracker unit is recovered from a water surface, the method includes the following steps:

during recovery, floating the automatic positioning tracker unit up to the water surface by using a buoyancy device configured for the underwater observation system, automatically turning on the GPS and radio communication module of the automatic positioning tracker unit under an action of the pressure switch, sending an accurate position obtained by an internal GPS to the GPS and external antenna terminal of the first control unit over radio, and after the accurate position of the automatic positioning tracker unit on the water surface is obtained, planning a hull sailing path by using the first control unit before the recovery.

The present invention has the following beneficial effects:

The system can effectively achieve quick tracking and positioning of an automatic positioning tracker unit under water and on the water surface respectively. When in a state of recovery from the water surface, the system can effectively avoid the problems that the automatic positioning tracker unit floats up and down too fast due to influence of waves when floating on the water surface under an action of a floating ball, so that it is difficult to measure a slant range, the automatic positioning tracker unit drifts fast due to influence of wind, and an accurate position of the automatic positioning tracker unit as a moving target cannot be obtained by using a three-point positioning method. In addition, the system can further improve accuracy of the position obtained by the internal GPS.

BRIEF DESCRIPTION OF DRAWINGS

To describe implementations of the present invention or technical solutions in the conventional technology more clearly, the following briefly describes accompanying drawings required for describing the implementations or the conventional technology. Structures, proportions, sizes and the like shown in the specification are intended only to match content disclosed in the specification for understanding and reading by those familiar with the technology. Any modification of the structures, change of the proportions or adjustment of the sizes shall fall within the scope covered by technical content disclosed by the present invention without affecting effects and purposes of the present invention.

Figure 1:
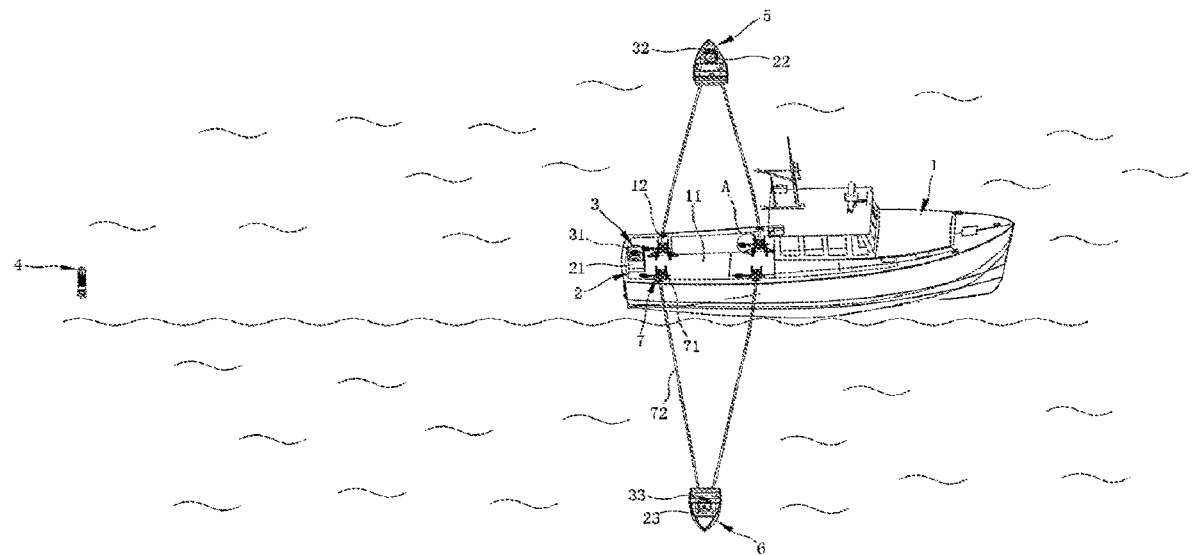
FIG. 1 is a schematic diagram of an overall structure of a water surface and underwater dual-purpose automatic positioning and tracking system according to an embodiment of the present invention.

In the accompanying drawings, components represented by reference numerals are listed as follows:

Main hull structure 1: ship deck 11, positioning guide seat 12;

Electric control module 2: first electric control module 21, second electric control module 22, third electric control module 23;

Communication control unit 3: first control unit 31, second control unit 32, third control unit 33, LCD touch screen 34, GPS and external antenna terminal 35;

Automatic positioning tracker unit 4: circuit board 41, battery 42, acoustic transducer 43, radio antenna 44, pressure switch 45;

First auxiliary positioning remote control ship 5; second auxiliary positioning remote control ship 6; and Rope winding and unwinding structure 7: rope roller 71, winding and unwinding rope 72, and servo motor 73.

DESCRIPTION OF EMBODIMENTS

Implementations of the present invention are described below in specific embodiments. Those familiar with the technology can easily understand other advantages and effects of the present invention from content disclosed in the specification. Apparently, the described embodiments are some but not all of embodiments of the present invention. Based on the embodiments of the present invention, all other embodiments obtained by those of ordinary skill in the art without creative work should fall within the protection scope of the present invention.

Terms such as "upper", "lower", "left", "right", and "middle" cited in the specification are only for clarity of description, and are not intended to limit the scope of the present invention. A change or adjustment of a relative relationship should also be regarded as the scope of the present invention without substantial changes in technical content.

An embodiment of the present invention provides a surface and underwater dual-purpose automatic positioning and tracking system as shown in FIG. 1 to FIG. 4. The positioning and tracking system includes a main hull structure 1, an electric control assembly 2, a communication control unit 3, an automatic positioning tracker unit 4, a first auxiliary positioning remote control ship 5, a second auxiliary positioning remote control ship 6, and a rope winding and unwinding structure 7. The system is divided into two parts: an above-water unit formed by the communication control unit 3, and an underwater unit formed by the automatic positioning tracker unit 4. When the system is launched into water, the automatic positioning tracker unit 4 acting as the underwater unit can, under monitoring of the pressure switch 45 inside the automatic positioning tracker unit 4, automatically turn on an acoustic transducer 43, and can receive a ranging signal from the communication control unit 3 acting as the above-water unit at any time. The acoustic transducer 43 then gives a slant range between the acoustic transducer 43 and a deck unit transducer inside the communication control unit 3. When a first slant range measurement is completed, another two positioning points to be measured and a path planning are automatically given on an LCD touch screen 34 of the communication control unit 3. In this case, a ship for system recovery continues to go to another two positioning points based on the path planning to measure slant ranges, and inputs current water depth obtained by an onboard depth sounder, so that the communication control unit 3 can automatically calculate a trigonometric function by using slant ranges and water depths at the three points and a latitude and a longitude from the internal GPS after measurements at the three points, so as to give an accurate position of the automatic positioning tracker unit 4 on the LCD touch screen 34. The accurate position can be used at least for launching recording and system position reference before recovery of the automatic positioning tracker unit 4.

When the system recovers the automatic positioning tracker unit 4, the automatic positioning tracker unit 4 floats up to the water surface, and under the monitoring of the pressure switch 45, a GPS and radio communication module in the automatic positioning tracker unit 4 is automatically turned on, and an accurate position obtained by the internal GPS is sent to a GPS and external antenna terminal 35 of the communication control unit 3 over radio, and displayed on a screen map of the LCD touch screen 34. After the accurate position is obtained, path planning is carried out by using the communication control unit 3 to guide the ship to approach for recovery of the system from the water surface.

Figure 2:
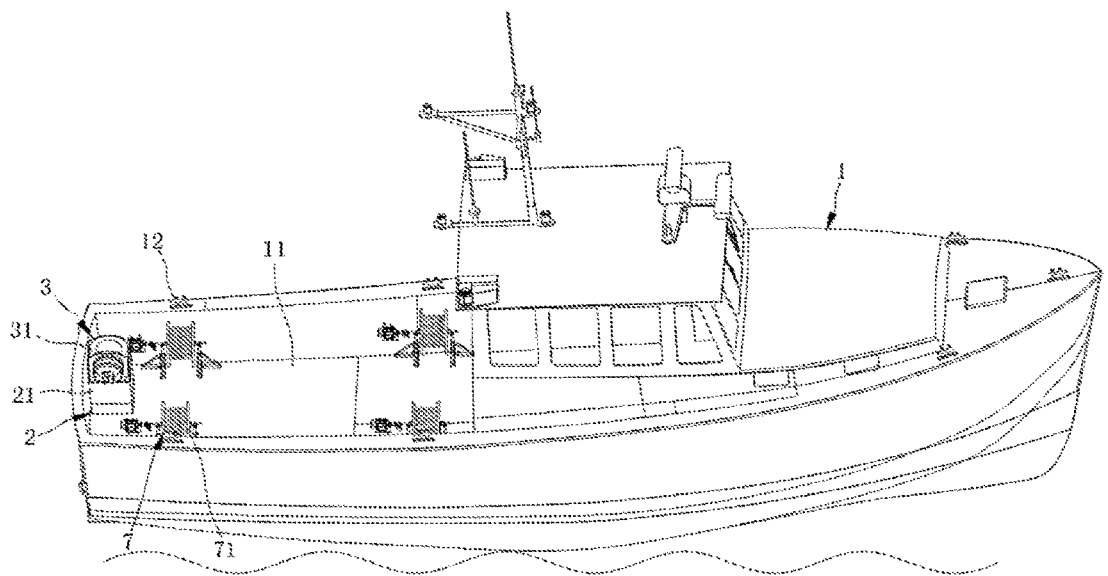
FIG. 2 is a schematic diagram of a main hull structure and a configuration structure thereof in a water surface and underwater dual-purpose automatic positioning and tracking system according to an embodiment of the present invention.
Figure 3:
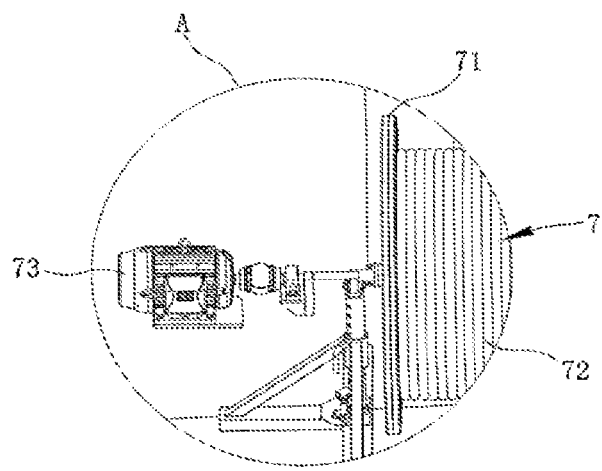
FIG. 3 is an enlarged schematic view of a structure at a position A in FIG. 1 of the water surface and underwater dual-purpose automatic positioning and tracking system according to an embodiment of the present invention.

In addition, when the automatic positioning tracker unit 4 is positioned by the system, a first auxiliary positioning remote control ship 5 and a second auxiliary positioning remote control ship 6 equipped with the communication control unit 3 may be released based on the main hull structure 1 by using a rope winding and unwinding structure 7. The first auxiliary positioning remote control ship 5 and the second auxiliary positioning remote control ship 6 gradually move away from the main hull structure 1 by their driving performance to form new positioning points with a function of the communication control unit 3 respectively. With the communication control unit 3 located on the main hull structure 1, slant range measurements at the three points are completed, and then a trigonometric function is automatically calculated by using slant ranges and water depths at the three points and a latitude and a longitude from the internal GPS, so as to give an accurate position of the automatic positioning tracker unit 4 on the LCD touch screen 34 of the main hull structure 1. Finally, the first auxiliary positioning remote control ship 5 and the second auxiliary positioning remote control ship 6 are respectively recovered by using the rope winding and unwinding structure 7, so as to improve adaptability of the system to different sea conditions. A specific arrangement is as follows:

As shown in FIG. 1 to FIG. 3, the main hull structure 1 has a ship deck 11; there are several sets of rope winding and unwinding structures 7, and the several sets of rope winding and unwinding structures 7 are fixedly installed on the ship deck 11 to release and recover the auxiliary positioning remote control ships by using the rope winding and unwinding structures 7.

Specifically, still referring to FIG. 1 to FIG. 3, the rope winding and unwinding structures 7 each include a rope roller 71 and winding and unwinding ropes 72 sequentially wound around the rope roller 71, a servo motor 73 is in transmission connection at one end of a main shaft of the rope roller 71, so that the rope roller 71 can form an electric rope roller 71 by means of rotational kinetic energy output by the servo motor 73. There are four sets of electric rope rollers 71, and the electric rope rollers are fixed in pairs on two side ends of the ship deck 11 in a sailing direction, where winding and unwinding ropes 72 of the two sets of rope rollers 71 at one side end are in transmission connection with the first auxiliary positioning remote control ship 5 at one end away from the rope rollers 71, and winding and unwinding ropes 72 of the two sets of rope rollers 71 at the other side end are in transmission connection with the second auxiliary positioning remote control ship 6 at one end away from the rope rollers 71. Winding and unwinding speeds and lengths of the winding and unwinding ropes 72 of the two sets of rope rollers 71 at each side end are identical; and the first auxiliary positioning remote control ship 5 and the second auxiliary positioning remote control ship 6 are always located at midperpendicular positions of connecting lines between corresponding two sets of rope rollers 71, so as to drive the winding and unwinding ropes 72 by the electric rope rollers 71 to respectively release and recover the first auxiliary positioning remote control ship 5 and the second auxiliary positioning remote control ship 6. In addition, when the first auxiliary positioning remote control ship 5 and the second auxiliary positioning remote control ship 6 actively sail to farthest positions, real-time positions of the first auxiliary positioning remote control ship 5 and the second auxiliary positioning remote control ship 6 can be accurately calculated and obtained due to limitations on lengths of the winding and unwinding ropes 72 and angles with respect to the rope rollers 71, thus facilitating calculation of a subsequent positioning procedure.

Preferably, at least one positioning guide seat 12 is fixedly connected to top of side walls on two sides of the ship deck 11 at positions corresponding to the rope rollers 71, and the winding and unwinding ropes 72 pass through the positioning guide seat 12 from the rope rollers 71 and are in transmission connection with the first auxiliary positioning remote control ship 5 or the second auxiliary positioning remote control ship 6, so as to help stabilize one end of the winding and unwinding ropes 72, thereby improving accuracy of subsequent angle calculation.

Still referring to FIG. 1 to FIG. 3, the electric control assembly 2 includes a power supply and a control module that are electrically connected, and the control module is connected to the communication control units 3 by using a circuit.

Specifically, the electric control assembly 2 includes a first electric control module 21, a second electric control module 22, and a third electric control module 23; and the communication control unit 3 includes a first control unit 31, a second control unit 32, and a third control unit 33; where the first electric control module 21 and the first control unit 31 are connected by using a circuit and are arranged on the ship deck 11, the second electric control module 22 and the second control unit 32 are connected by using a circuit and are arranged on the first auxiliary positioning remote control ship 5, and the third electric control module 23 and the third control unit 33 are connected by using a circuit and are arranged on the second auxiliary positioning remote control ship 6, so that the first control unit 31, the second control unit 32 and the third control unit 33 follow the main hull structure 1, the first auxiliary positioning remote control ship 5 and the second auxiliary positioning remote control ship 6 respectively to complete slant range measurements for the automatic positioning tracker unit 4.

Figure 4:
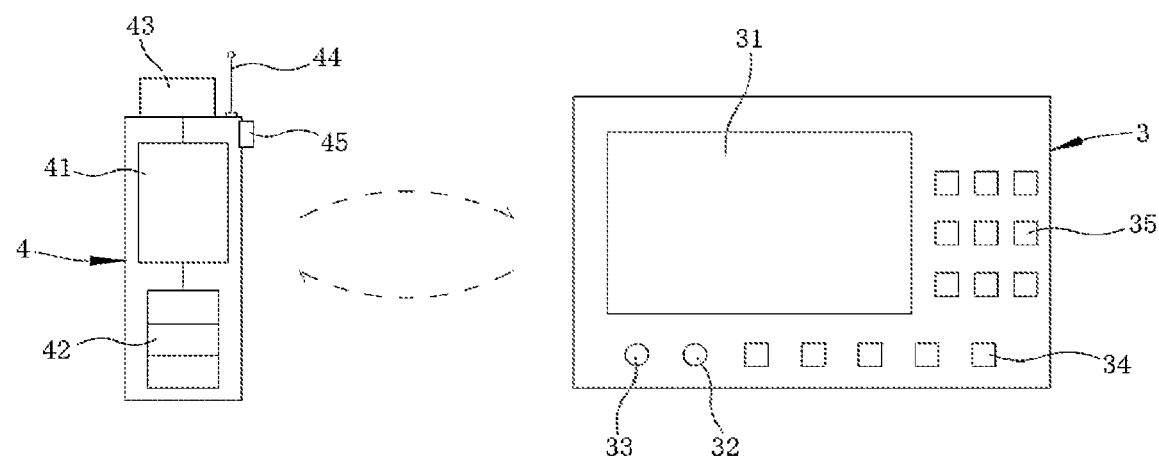
FIG. 4 is a schematic diagram of a communication interaction structure between a communication control unit and an automatic positioning tracker unit in a water surface and underwater dual-purpose automatic positioning and tracking system according to an embodiment of the present invention.

More specifically, referring to FIG. 4, the first control unit 31, the second control unit 32 and the third control unit 33 each include a control panel body, and an LCD touch screen 34, a GPS and external antenna terminal 35, a deck unit transducer, a switch and shortcut keys for path planning, and an input button for inputting a water depth that are respectively arranged on the control panel body; where control modules in the first electric control module 21, the second electric control module 22, and the third electric control module 23 are respectively in communication connection with the LCD touch screen 34, the GPS and external antenna terminal 35, and the deck unit transducer in a one to one correspondence by using a circuit; and the switch, the shortcut keys, and the input button are respectively connected to control input terminals of the control modules in the first electric control module 21, the second electric control module 22, and the third electric control module 23 in a one to one correspondence by using a circuit; and a control output terminal of the control module in the first electric control module 21 is connected to electric input terminals of the electric rope rollers 71 located at two side ends of the ship deck 11 by using circuits.

Still referring to FIG. 4, the automatic positioning tracker unit 4 includes a circuit board 41, and a battery 42, an acoustic transducer 43, a radio antenna 44 and a pressure switch 45 that are respectively arranged on the circuit board 41; where the circuit board 41 is further provided with a GPS and radio communication module; the GPS and radio communication module is in communication connection with the GPS and external antenna terminal 35 by using the radio antenna 44, the acoustic transducer 43 is in communication connection with the deck unit transducer, and the pressure switch 45 can monitor a water pressure at a position where the automatic positioning tracker unit 4 is located in real time.

A method using the water surface and underwater dual-purpose automatic positioning and tracking system according to this embodiment, including the following steps:

S1: launching the automatic positioning tracker unit 4 acting as an underwater unit into water;

S2: when the automatic positioning tracker unit 4 is launched to a predetermined depth, automatically turning on the acoustic transducer 43 inside the automatic positioning tracker unit 4 under an action of a water pressure, and in this case, sending, by the first control unit 31 arranged on the main hull structure 1 and acting as an above-water unit, a ranging signal, receiving, by the acoustic transducer 43, the ranging signal, and giving, by the acoustic transducer, a real-time slant range between the acoustic transducer and the deck unit transducer inside the first control unit 31 for the first time;

S3: after a first slant range measurement is completed, automatically giving, by the first control unit 31, another two positioning points to be measured and a sailing path planning for the main hull structure 1, where the main hull structure 1 continues to go to the another two positioning points based on the path planning, repeating the foregoing steps to respectively carry out a second slant range measurement and a third slant range measurement, and after slant ranges at the three points are measured, inputting, by the first control unit 31, current water depth data by using the input button, and automatically calculating, by the first control unit 31, a trigonometric function based on a latitude and a longitude obtained by an internal GPS, so as to obtain a real-time accurate position of the automatic positioning tracker unit 4 under water, and display the position on the LCD touch screen 34 of the first control unit 31 for launching recording and position reference before system recovery;

S4: during recovery of the automatic positioning tracker unit 4 from a water surface, floating the automatic positioning tracker unit 4 up to the water surface by using a floating ball configured for the observation system, automatically turning on the GPS and radio communication module of the automatic positioning tracker unit 4 under an action of the pressure switch 45, sending an accurate position obtained by the internal GPS to the GPS and external antenna terminal 35 of the first control unit 31 over radio, and after the accurate position of the automatic positioning tracker unit 4 on the water surface is obtained, planning a hull sailing path by using the first control unit 31 before the recovery.

Another method using the water surface and underwater dual-purpose automatic positioning and tracking system according to this embodiment, including the following steps:

S1: launching the automatic positioning tracker unit 4 acting as an underwater unit into water;

S2: remotely starting the first auxiliary positioning remote control ship 5 and the second auxiliary positioning remote control ship 6, respectively, so that the first auxiliary positioning remote control ship 5 and the second auxiliary positioning remote control ship 6 can automatically sail by their own driving performance until the two sets of winding and unwinding ropes 72 connected to the remote control ships are automatically released to a maximum value, and then the remote control ships stop sailing;

S3: when the automatic positioning tracker unit 4 is released to a predetermined depth, automatically turning on the acoustic transducer 43 inside the automatic positioning tracker unit 4 under an action of a water pressure, and in this case, synchronously sending, by the first control unit 31 arranged on the main hull structure 1, the second control unit 32 arranged on the first auxiliary positioning remote control ship 5 and the third control unit 33 arranged on the second auxiliary positioning remote control ship 6 that act as above-water units, ranging signals, receiving, by the acoustic transducer 43, the ranging signals, and giving, by the acoustic transducer, real-time slant ranges between the acoustic transducer and the deck unit transducers inside the first control unit 31, the second control unit 32, and the third control unit 33;

S4: communicating, by the second control unit 32 and the third control unit 33, measured slant ranges to the first control unit 31 by using an antenna, inputting, by the first control unit 31, current water depth data by using the input button, and automatically calculating, by the first control unit 31, a trigonometric function based on a latitude and a longitude obtained by the internal GPS, so as to obtain a real-time accurate position of the automatic positioning tracker unit 4 under water, and display the position on the LCD touch screen 34 of the first control unit 31 for launching recording and position reference before system recovery;

S5: during recovery of the first auxiliary positioning remote control ship 5 and the second auxiliary positioning remote control ship 6, correspondingly controlling and starting, by the control module in the first electric control module 21, electric rope rollers 71 located at two side ends of a ship deck 11, so that the electric rope rollers 71 at each side end synchronously start running and recover winding and unwinding ropes 72, until the first auxiliary positioning remote control ship 5 and the second auxiliary positioning remote control ship 6 return to initial positions after a set quantity of revolutions; and S6: during recovery of the automatic positioning tracker unit 4 from a water surface, floating the automatic positioning tracker unit 4 up to the water surface by using a floating ball thereof, automatically turning on the GPS and radio communication module of the automatic positioning tracker unit 4 under an action of the pressure switch 45, sending an accurate position obtained by the internal GPS to the GPS and external antenna terminal 35 of the first control unit 31 over radio, and after the accurate position of the automatic positioning tracker unit 4 on the water surface is obtained, planning a hull sailing path by using the first control unit 31 before the recovery.

Although the present invention has been described in detail with general description and specific embodiments, it is obvious to those skilled in the art that some modifications or improvements can be made on the basis of the present invention. Therefore, these modifications or improvements made without departing from the spirit of the present invention should fall within the protection scope of the present invention.

The invention claimed is:

1. A water surface and underwater dual-purpose automatic positioning and tracking system, arranged on a main hull structure, wherein the positioning and tracking system comprises:
  a rope winding and unwinding structure, arranged on the main hull structure, wherein the rope winding and unwinding structure comprises a rope roller and a winding and unwinding rope wound around the rope roller;
  an auxiliary positioning remote control ship, located outside a main body of the main hull structure, wherein the auxiliary positioning remote control ship is in transmission and fixed connection with one end that is of the winding and unwinding rope and that is away from the rope roller;
  communication control units, arranged on the main hull structure and the auxiliary positioning remote control ship respectively; and
  an automatic positioning tracker unit, arranged outside the hull structure, wherein the automatic positioning tracker unit is in remote communication connection with the communication control units;
  the auxiliary positioning remote control ship comprises a first auxiliary positioning remote control ship and a second auxiliary positioning remote control ship that are respectively located on two outer sides of the main body of the main hull structure;
  four sets of rope rollers are provided, the rope rollers are fixed in pairs at two side ends of the main hull structure in a sailing direction, winding and unwinding ropes of the two sets of rope rollers at one side end are in transmission and fixed connection with the first auxiliary positioning remote control ship at one end away from the rope rollers; and winding and unwinding ropes of the two sets of rope rollers at the other side end are in transmission and fixed connection with the second auxiliary positioning remote control ship at one end away from the rope rollers;
  winding and unwinding speeds and lengths of the winding and unwinding ropes of the two sets of rope rollers at each side end are identical; and
  the first auxiliary positioning remote control ship and the second auxiliary positioning remote control ship are always located at midperpendicular positions of connecting lines between corresponding two sets of rope rollers.

2. The water surface and underwater dual-purpose automatic positioning and tracking system according to claim 1, further comprising an electric control assembly; wherein the electric control assembly comprises a power supply and a control module that are electrically connected, and the control module is connected to the communication control units by using a circuit.

3. The water surface and underwater dual-purpose automatic positioning and tracking system according to claim 2, wherein
  the electric control assembly comprises a first electric control module, a second electric control module, and a third electric control module; and the communication control units comprise a first control unit, a second control unit, and a third control unit; and
  the first electric control module and the first control unit are connected by using a circuit and are arranged in the main hull structure, the second electric control module and the second control unit are connected by using a circuit and are arranged in the first auxiliary positioning remote control ship, and the third electric control module and the third control unit are connected by using a circuit and are arranged in the second auxiliary positioning remote control ship.

4. The water surface and underwater dual-purpose automatic positioning and tracking system according to claim 3, wherein
  the first control unit, the second control unit and the third control unit each comprise a control panel body, and an LCD touch screen, a GPS and external antenna terminal, a deck unit transducer, a switch and shortcut keys for path planning, and an input button for inputting a water depth that are respectively arranged on the control panel body;
  control modules in the first electric control module, the second electric control module, and the third electric control module are respectively in communication connection with the LCD touch screen, the GPS and external antenna terminal, and the deck unit transducer in a one to one correspondence by using a circuit; and the switch, the shortcut keys, and the input button are respectively connected to control input terminals of the control modules in the first electric control module, the second electric control module, and the third electric control module in a one to one correspondence by using a circuit; and
  a control output terminal of the control module in the first electric control module is connected to electric input terminals of the rope rollers located at two side ends of the main hull structure by using circuits.

5. The water surface and underwater dual-purpose automatic positioning and tracking system according to claim 4, wherein
  the automatic positioning tracker unit comprises a circuit board, and a battery, an acoustic transducer, a radio antenna and a pressure switch that are respectively arranged on the circuit board; the circuit board is further provided with a GPS and radio communication module; and
  the GPS and radio communication module is in communication connection with the GPS and external antenna terminal by using the radio antenna, and the acoustic transducer is in communication connection with deck unit transducers of the first control unit, the second control unit, and the third control unit respectively.

6. A method using the water surface and underwater dual-purpose automatic positioning and tracking system according to claim 5, wherein when obtaining a real-time accurate position of the automatic positioning tracker unit under water, the method comprises the following steps:

S1: installing the automatic positioning tracker unit on an underwater observation system and launching the underwater observation system into water;

S2: when the underwater observation system equipped with the automatic positioning tracker unit is launched to a predetermined depth, automatically turning on the acoustic transducer inside the automatic positioning tracker unit under an action of a water pressure, and in this case, sending, by the first control unit arranged on the main hull structure and acting as an above-water unit, a ranging signal, receiving, by the acoustic transducer, the ranging signal, and giving, by the acoustic transducer, a real-time slant range between the acoustic transducer and the deck unit transducer inside the first control unit for the first time; and S3: after a first slant range measurement is completed, automatically giving, by the first control unit, another two positioning points to be measured and a sailing path planning for the main hull structure, wherein the main hull structure continues to go to the another two positioning points based on the path planning, repeating the foregoing steps to respectively carry out a second slant range measurement and a third slant range measurement, and after slant ranges at the three points are measured, inputting, by the first control unit, water depth data of the three measurement points by using the input button, and automatically calculating, by the first control unit, a trigonometric function based on a latitude and a longitude obtained by an internal GPS, so as to obtain a real-time accurate position of the automatic positioning tracker unit under water, and display the position on the LCD touch screen of the first control unit for launching recording and position reference before system recovery.

7. A method using the water surface and underwater dual-purpose automatic positioning and tracking system according to claim 5, wherein when obtaining a real-time accurate position of the automatic positioning tracker unit under water, the method comprises the following steps:

S1: installing the automatic positioning tracker unit on an underwater observation system and launching the underwater observation system into water;

S2: remotely starting the first auxiliary positioning remote control ship and the second auxiliary positioning remote control ship, respectively, so that the first auxiliary positioning remote control ship and the second auxiliary positioning remote control ship can automatically sail by their own driving performance until the two sets of winding and unwinding ropes connected to the remote control ships are automatically released to a maximum value, and then the remote control ships stop sailing;

S3: when the automatic positioning tracker unit is launched to a predetermined depth, automatically turning on the acoustic transducer inside the automatic positioning tracker unit under an action of a water pressure, and in this case, successively sending, by the first control unit arranged on the main hull structure, the second control unit arranged on the first auxiliary positioning remote control ship and the third control unit arranged on the second auxiliary positioning remote control ship that act as above-water units, ranging signals, receiving, by the acoustic transducer, the ranging signals, and giving, by the acoustic transducer, real-time slant ranges between the acoustic transducer and the deck unit transducers inside the first control unit, the second control unit, and the third control unit;

S4: communicating, by the second control unit and the third control unit, measured slant ranges and obtained GPS position data to the first control unit by using an antenna, inputting, by the first control unit, current water depth data and a latitude and a longitude obtained by an internal GPS by using the input button, and automatically calculating a trigonometric function based on data returned by the second control unit and the third control unit, so as to obtain a real-time accurate position of the automatic positioning tracker unit under water, and display the position on the LCD touch screen of the first control unit for launching recording and position reference before system recovery; and S5: during recovery of the first auxiliary positioning remote control ship and the second auxiliary positioning remote control ship, correspondingly controlling and starting, by the control module in the first electric control module, electric rope rollers located at two side ends of a ship deck, so that the electric rope rollers at each side end synchronously start running and recover winding and unwinding ropes, until the first auxiliary positioning remote control ship and the second auxiliary positioning remote control ship return to initial positions after a set quantity of revolutions.

8. A method using the water surface and underwater dual-purpose automatic positioning and tracking system according to claim 5, wherein when a submerged buoy, a seabed foundation or another system equipped with the automatic positioning tracker unit is recovered from a water surface, the method comprises the following steps:

during recovery, floating the automatic positioning tracker unit up to the water surface by using a buoyancy device configured for the underwater observation system, automatically turning on the GPS and radio communication module of the automatic positioning tracker unit under an action of the pressure switch, sending an accurate position obtained by an internal GPS to the GPS and external antenna terminal of the first control unit over radio, and after the accurate position of the automatic positioning tracker unit on the water surface is obtained, planning a hull sailing path by using the first control unit before the recovery.

* * * * *